Figures 1, 2, 3:
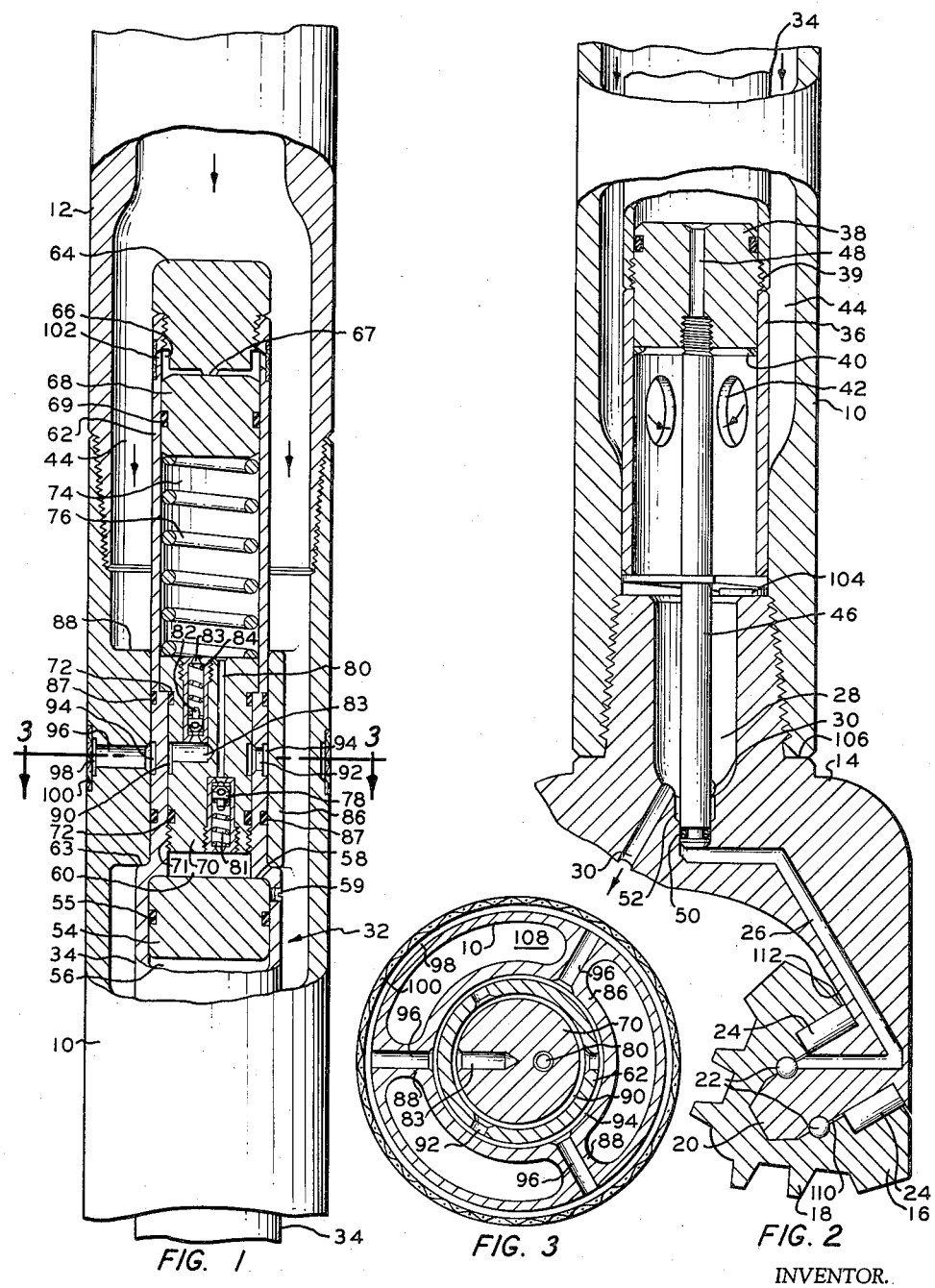

Jan. 23, 1962

R. A. BOBO 3,017,937

LUBRICATOR FOR EARTH BORING BIT

Filed Nov. 10, 1958

INVENTOR.
R. A. BOBO

BY *Hudson & Young*

ATTORNEYS 3,017,937
LUBRICATOR FOR EARTH BORING BIT
Roy A. Bobo, Houston, Tex., assignor to Phillips Petroleum Company, a corporation of Delaware
Filed Nov. 10, 1958, Ser. No. 773,055
10 Claims. (Cl. 175—228)

This invention relates to apparatus for lubricating the bearings of an earth boring drill bit used in drilling for oil, water, sulfur, ores, and the like.

Rolling cutter rock bits have come into wide use in the drilling of deep boreholes in the search for oil and other valuable deposits in the earth. In using bits of this type, no adequate means has been found for properly lubricating the bearings of the rolling cutters, with the result that the bearings usually freeze before the teeth of the cutters wears out and the drill bit fails because of the failure of the bearings. Maintaining proper metallurgy and design with relation to rock bits has been a difficult problem thru the years. Better cutters have shown deficiencies in bearing design; and better bearings have shown deficiencies in the cutters. At the present time, because of higher rotating speeds and increased weight on the bit, bearings have been failing while the cutter teeth are still in relatively good condition. Hence, there is a definite need for increasing bearing life in the art of drilling deep boreholes.

To illustrate the necessity of increasing bearing life and, therefore, bit life, as a prerequsite to the reduction of drilling costs, reference is made to the fact that in drilling deeper wells, roughly ⅓ of the total time is spent in replacing bits and only ⅔ of the time in productive drilling. Hence, a 50 percent improvement in bit life would result in a significant reduction in the cost of drilling a well.

Present bit lubricators are not subject to the will of the driller but on the contrary are of the continuous type which frequently results in the operation of the bit without lubricant in the bearings due to the difficulty of metering the flow of lubricant so that the lubricant lasts during the entire interval between insertion and removal of the bit from the hole.

It is accordingly an object of the invention to provide a novel drill bit lubricating device which assures positive lubrication of the bit bearings during the entire drilling period between insertion and withdrawal of the drill string from the hole. Another object is to provide a novel single-acting drill bit bearing lubricator which is operable at the will of the driller. A further object is to provide apparatus which reduces wear on the drill bit bearings and increases the life of the bit. It is also an object to provide apparatus which decreases the actual time spent in making hole in a drilling process. Other objects of the invention will become apparent upon consideration of the accompanying disclosure.

The invention comprises a single-acting lubricator which injects lubricant around the bearings of a drill bit whenever the mud pumps are stopped and started. In other words the lubricator injects lubricant into the bit bearings only when there is an increase in differential pressure between the drilling fluid pressure outside of the drill stem and the drilling fluid pressure within the drill stem in favor of the latter. This increase in differential pressure can be effected by the driller merely by stopping the drilling fluid pumps and restarting them, whereby the fluid pressures within and outside the drill stem are equalized and then unequalized in favor of the fluid pressure in the drill string.

In normal drilling operations, the mud pumps are stopped after approximately each thirty feet of drilling in order to add another length of pipe (30′) to the drill string and, upon restarting the mud pumps, lubricant is ordinarily injected into the bearings of the bit cones. However, in slow drilling operations thru a particularly hard stratum or layer of rock, the bit bearings may be lubricated at the will of the driller by merely stopping the mud pumps and restarting the same at any desired frequency such as 20 or 30 minutes to an hour or more of drilling time.

A more complete understanding of the invention may be obtained by reference to the accompanying schematic drawing of which FIGURES 1 and 2 are longitudinal complementary sections thru the lubricator of the invention positioned on the lower end of the drill string; and FIGURE 3 is a cross section of the apparatus of FIGURE 1 taken on the line 3—3. FIGURE 2 is an extension of FIGURE 1.

Referring to FIGURES 1 and 2, a drill collar sub 10 is attached at the upper end to a drill string 12 and at the lower end to a drill or drill head 14 which is provided with two or more, usually 3, roller bit cones 16 with teeth 18. Each bit cone is mounted on a spindle 20 with bearings comprising a race of balls 22 and rollers 24, in conventional manner. The bit of the invention is provided with lubricant ducts 26 leading from the central bore 28 of the bit to the bearings 22 and with bit jets 30 leading from the central bore 28 to each of the bit cones for injection of drilling mud to the cutters.

Collar sub 10 serves as a housing for lubricator assembly 32 which comprises a housing 34 including tail section 36 joined by closure plug 38 to which housing 34 is threaded at 39 and to which tail section 36 is welded at 40. Ports 42 open thru the wall of tail section 36 for passage of drilling fluid between annulus 44 and the interior of section 36, which in turn is open to the central bore 28 of the bit. Lubricant barrel 46 is threaded into plug 38 to form a seal therewith and plug 38 is bored at 48 to provide a duct leading into the lubricant barrel. The other end of the lubricant barrel is sealed in the central bore of the bit by means of seal ring 50 and connects with lubricant ducts 26. A larger bore at 52 is provided to facilitate entry of lubricant barrel 46 when threading the bit onto collar 10 during assembly.

Lubricating plunger 54 is slidably sealed by O-ring 55 with the inner cylindrical bore of housing 34 and forms a lubricant reservoir 56 with fixed plug 38. Plunger 54 is shown in position against shoulder 58 where it is located upon filling the lubricant reservoir. Screw plug 59 is removed when filling lubricant reservoir 56 thru barrel 46 so that drilling fluid in compartment 60 is expelled thru the opening left by removal of plug 59. The head section 62 of housing 34 is of smaller diameter than the main housing 34 to form a shoulder 63 for firmly supporting the applicator assembly as hereinafter explained. Head section 62, which serves as a plunger barrel for plunger 68, is capped by means of a screw plug or closure 64 which is machined to provide an annulus 66 and a projection 67 for providing space for drilling fluid to actuate plunger 68. Actuating plunger 68 is slidably sealed by means of O-ring 69 with the inner wall of section 62 or the plunger barrel. In the end of section 62 adjacent the reservoir section of housing 34, valve body 70 is threaded into the housing at 71 and is provided with seal rings 72. Valve body 70 forms a chamber 74 with actuating plunger 68 within the plunger barrel for restricted movement of the plunger toward the valve body. Compression spring 76 is positioned in chamber 74 to normally hold plunger 68 against projection 67 and permit limited movement of plunger 68 toward the valve body. Check valve 78 is normally forced against its seat in duct 80 by spring 81 but is movable off its seat by fluid pressure in chamber 74 to permit flow of fluid from chamber 74 to compartment 60. Check valve 82 is normally forced against its seat in duct 83 by spring 84 but is movable off its seat to permit flow of fluid thru duct 83 into chamber 74 when the fluid pressure outside of the housing is greater than the fluid pressure in chamber 74. Pressure in chamber 74 becomes less than that outside the drill string when the mud pumps stop and pressures on the drill string and in the annulus are equalized, due to the expansive force of compressor spring 76.

The housing of the lubricant applicator assembly is axially supported in collar sub 10 by means of hub 86 which surrounds head section 62 in close engagement therewith and is sealed therewith by O-rings 87. Hub 86 is integral with supporting spokes 88 which are fixed to the inner wall of collar sub 10 by any suitable means, such as by welding. The hub and spoke support means, as well as the duct system for passing fluid into chamber 74 thru valve duct 83, is better understood by reference to FIGURE 3 which is described hereinafter.

Duct 83 leads into an annular groove 90 which connects with port 92 thru the wall of section 62. Port 92 also connects with annular groove 94 in the outer surface or wall of section 62, and groove 94 connects with port 96 extending from another annular groove 98 in the outer wall of collar 10 which is covered by screen 100, thereby completing the passageway from chamber 74 thru valve duct 83 to the annulus surrounding the drill string or collar assembly when positioned in a borehole. Screened ports 102 are provided in housing section 62 intermediate closure plug 64 and actuating plunger 68 for the ingress and egress of drilling fluid.

The internal elements of head section 62 are readily insertable in the order shown from bottom to top of the assembly before threading closure 64 into the end of the housing. Lubricating plunger 54 and plug 38 are insertable in that order into the main housing 34 and after threading plug 38 into position, tail section 36 is forced over the exposed end of the plug and is welded in position. The entire lubricant applicator assembly 32 with lubricant barrel 46 threaded into plug 38 is slidable into its operating position as shown in the drawing thru the lower end of collar sub 10, preparatory to threading drill 14 into position. Before threading the drill into the end of collar 10, a suitable tensioning element or spring 104, which may be a heavy lock washer, is placed against the end of tail section 36 so that when the bit is threaded tightly against shoulder 106, compression of element 104 maintains the applicator assembly tightly shouldered against the hub-spoke assembly at 63.

FIGURE 3 shows the arrangement of hub 86 and supporting spokes 88 within collar sub 10 holding head section 62 of housing 34 firmly in place. This figure also shows the arrangement of ports leading thru the wall of the collar and thru the spokes to the annular grooves and ducts forming a passageway into valve duct 83 from outside the collar sub assembly. The hub-spoke support assembly provides passageways 108 for flow of drilling fluid around the support means and thru annulus 44.

In operation of the device described, starting of the mud pumps effects an increase or surge in pressure in annulus 44 as compared with the mud pressure in the annulus between the drill string and the wall of the borehole which results in flow of drilling fluid thru screened ports 102 into the space between closure 64 and actuating plunger 68 thereby forcing the plunger toward the valve body 70. Movement of actuating plunger 68 toward valve body 70 against the compressive force of spring 76 forces valve 82 against its seat and valve 78 away from its seat so that drilling fluid flows from chamber 74 into the compartment 60 behind lubricating plunger 54 and acts on the latter to force the same toward plug 38 and to expel lubricant from reservoir 56 thru duct 48, lubricant barrel 46, and lubricant ducts 26 to bearings 22 from which excess lubricant passes thru the small clearance 110 to roller bearings 24. Upon each application of lubricant, the old lubricant is expelled thru clearance space 112 around the base of bit cones 16.

When the pumps circulating drilling fluid thru the drill string annulus, out the bit jets, and up the outer annulus are working under normal drilling conditions, the pressure in annulus 44 is greater than that in the outer annulus and holds actuating plunger 68 against compressed spring 76. Upon stopping of the mud pumps, actuating plunger 68 is forced back into contact with plug 64 as a result of equalization of pressure outside and inside of collar 10. This causes flow of drilling fluid from the outer annulus thru ports 96, annular groove 94, ports 92, and annular groove 90, into valve duct 83, forcing valve 82 off its seat and admitting drilling fluid into chamber 74 so that the lubricant applicator is in position to again inject lubricant into the bit cone bearings in the manner described when the fluid pumps are again operated. During return of actuating plunger 68 to its operating position, valve 78 prevents escape of drilling fluid from compartment 60 back into chamber 74.

Lubricant reservoir 56 may be recharged or filled any time when the bit is pulled by unscrewing the bit from the end of collar 10, removing the entire applicator assembly 32, unscrewing plug 59 and injecting a fresh supply of lubricant thru lubricant barrel 46, or by removing the lubricant barrel and injecting directly thru bore 48 of plug 38. The filling of reservoir 56 in this manner forces plunger 54 to the starting position which expells fluid from compartment 60 thru the vent left by plug 59.

Injection of the lubricant periodically to the bit bearings purges the same of any metallic elements and other contaminants that may have invaded the bearings. In addition, it definitely prolongs the life of the bit bearings by conveying to the bearing chamber a lubricant of extreme pressure or other suitable type capable of contributing to the life of the bearing parts.

With the recent development of a special type of sealed bearings, the applicator of the invention may be used for periodically purging the sealed bearing chambers of metallic elements and renewing the grease supply therein. By sizing the diameter and stroke of the actuating plunger 68 in relation to the diameter of lubricating plunger 54, any desired amount of lubricant may be applied periodically to the bit bearings; hence, the lubricator may be made to serve for long periods of time and with frequent pump stops and starts. This lubricator device is applicable to any type of bit drive-mechanism including that of the turbo-drill.

Certain modifications of the invention will become apparent to those skilled in the art and the illustrative details disclosed are not to be construed as imposing unnecessary limitations on the invention.

I claim:

1. In well drilling apparatus including a drill string and a drill head on said drill string having at least one roller cutter thereon, a lubricating mechanism within said drill string comprising a lubricant barrel connected at the drill head end with lubricant ducts leading thru said drill head to the bearings of said cutter; a tubular lubricant reservoir connected at its outlet end to the end of said lubricant barrel remote from said drill head; a lubricant plunger in said reservoir forming a seal therewith; plunger-actuating means on the end of said lubricant reservoir remote from said lubricant barrel for forcing said plunger toward said lubricant barrel upon first decreasing and thereafter increasing fluid pressure in said drill string; conduit means for bypassing fluid around said lubricating mechanism to said drill head; and means for supporting said lubricating mechanism in said drill string.

2. The apparatus of claim 1 wherein said plunger-actuating means comprises an actuating plunger barrel connected at one end with said lubricant reservoir; an actuating plunger spring-biased in the end of said plunger barrel remote from said reservoir; a valve body forming a closure across said plunger barrel and a chamber intermediate said actuating plunger and said valve body; a first check valve in a duct in said valve body leading from said chamber to said reservoir adjacent the end of said lubricant plunger adjacent said valve body, permitting flow from said chamber only; a second check valve in a duct in said valve body leading from outside of said plunger barrel thru said valve body into said chamber, permitting flow into said chamber only; a closure in the end of said plunger barrel remote from said valve body; and a port in the wall of said plunger barrel intermediate said closure and said actuating plunger.

3. The apparatus of claim 2 wherein the lubricating mechanism is supported by spokes extending from said plunger barrel opposite said valve body to the drill string tubing and including a duct thru said tubing and one of said spokes to the duct of said second check valve to permit fluid to enter said chamber from outside said drill string.

4. The apparatus of claim 1 wherein said lubricating mechanism is coaxial with said drill string and provides an annulus with the drill string tubing for flow of drilling fluid to said drill head, said lubricating mechanism being supported from said tubing by means of spokes.

5. Apparatus adapted to attach to the lower end of a drill string comprising a lubricator collar assembly including a collar attachable at one end to a drill string; a rolling cutter rock bit attached to the other end of said collar; a lubricating mechanism within said collar comprising a lubricant barrel sealed at one end into a central bore in said bit and extending into said collar assembly; lubricant ducts extending from said one end of said lubricant barrel thru said bit to the bearings of the cutters; a tubular housing extending from adjacent said bit to adjacent the end of said collar remote from said bit, forming an annulus with said collar for drilling fluid; a first plug in said housing spaced from said bit and having an axial conduit therethru connecting with and forming a continuous passage with said barrel; a lubricant plunger sealably engaging the wall of said housing and defining a lubricant reservoir with said first plug; a valve body forming a second plug in said housing on the side of said plunger remote from said first plug; a closure in the end of said housing remote from said bit; an actuating plunger in said housing adjacent said closure forming a chamber with said valve body; a compressible spring in said chamber urging said actuating plunger toward said closure; a port in said housing intermediate said closure and said actuating plunger; spokes extending from a hub encircling said housing opposite said valve body to the wall of said collar to support said housing in axial alignment with said collar; a first duct from said chamber thru said valve body to the space between same and said lubricating plunger; a check valve in said first duct permitting flow from said chamber to said space only; a second duct thru the wall of said housing and thru said valve body into said chamber; a check valve in said second duct permitting flow into said chamber only; and a third duct connecting the space outside said drill string with said second duct.

6. The apparatus of claim 5 wherein said third duct leads thru one of said spokes.

7. The apparatus of claim 5 wherein said third duct leads thru one of said spokes and said second duct comprises an annular groove in the outer surface of said housing, an annular groove in the outer surface of said valve body, a port thru the wall of said housing connecting said grooves, and an L-shaped passageway from the groove in said valve body into said chamber thru said valve body.

8. The apparatus of claim 5 wherein the section of said housing enclosing said valve body, actuating plunger, spring, and closure is of smaller diameter than the adjacent section so as to form a shoulder on said housing; and said collar assembly is held firmly seated against said hub by an element compressed between said drill bit and the end of said collar assembly.

9. The apparatus of claim 8 wherein the end of said housing adjacent said bit seats in said collar and is provided with ports intermediate the seating area and said first plug for flow of drilling fluid between said annulus and bit jets in said bit.

10. A single acting lubricator assembly for lubricating the bearings of a bit, comprising a tubular housing; a first plug in one end of said housing having a lubricant outlet duct therein; a lubricator plunger forming a lubricant reservoir with said first plug and slidably sealing with said housing; a closure in the end of said housing remote from said first plug; a valve body forming a second plug in said housing intermediate said lubricating plunger and said closure; an actuating plunger intermediate said closure and said valve body slidably sealing with said housing and forming a chamber with said valve body; a compression element in said chamber urging said actuating plunger toward said closure; a port in said housing intermediate said actuating plunger and said closure; first valved conduit means in said valve body for passing fluid from said chamber to the space between said valve body and said lubricating plunger only; and second valved conduit means in said valve body for passing fluid from outside of said housing into said chamber only.

References Cited in the file of this patent

UNITED STATES PATENTS

| | | |
|---|---|---|
| 1,453,875 | Hughes | May 1, 1923 |
| 1,576,370 | Scott | Mar. 5, 1926 |
| 1,909,128 | Scott et al. | May 16, 1933 |